United States Patent
Barton et al.

(10) Patent No.: US 10,683,046 B2
(45) Date of Patent: Jun. 16, 2020

(54) TANDEM LIFT AUXILIARY AXLE ASSEMBLY

(71) Applicant: RIDEWELL CORPORATION, Springfield, MO (US)

(72) Inventors: Bruce Barton, Springfield, MO (US); Matthew Koontz, Ozark, MO (US)

(73) Assignee: RIDEWELL CORPORATION, Springfield, MO (US)

( * ) Notice: Subject to any disclaimer, the term of this patent is extended or adjusted under 35 U.S.C. 154(b) by 135 days.

(21) Appl. No.: 16/059,928

(22) Filed: Aug. 9, 2018

(65) Prior Publication Data

US 2019/0061847 A1    Feb. 28, 2019

Related U.S. Application Data

(60) Provisional application No. 62/551,743, filed on Aug. 29, 2017.

(51) Int. Cl.
| | |
|---|---|
| *B62D 61/12* | (2006.01) |
| *B60G 5/04* | (2006.01) |
| *B60G 11/27* | (2006.01) |
| *B60G 5/02* | (2006.01) |

(52) U.S. Cl.
CPC ............ *B62D 61/125* (2013.01); *B60G 5/02* (2013.01); *B60G 5/04* (2013.01); *B60G 11/27* (2013.01); *B60G 2202/152* (2013.01); *B60G 2202/412* (2013.01); *B60G 2204/143* (2013.01); *B60G 2204/4702* (2013.01); *B60G 2300/402* (2013.01); *B60G 2400/61* (2013.01)

(58) Field of Classification Search
CPC .......... B62D 61/125; B60G 5/02; B60G 5/04; B60G 5/06; B60G 2300/402; B60G 11/27; B60G 2202/152; B60G 2202/412; B60G 2204/143; B60G 2204/4702; B60G 2400/61

See application file for complete search history.

(56) References Cited

U.S. PATENT DOCUMENTS

| | | | | |
|---|---|---|---|---|
| 2,906,358 | A | * | 9/1959 | Tucker, Sr. ............ B62D 61/12 180/23 |
| 3,881,565 | A | * | 5/1975 | Parrish ................... B60K 25/08 180/24.12 |
| 4,202,277 | A | * | 5/1980 | Browne .................. B60F 1/046 105/215.2 |
| 4,293,145 | A | | 10/1981 | Taylor |
| 4,300,787 | A | | 11/1981 | Vandenberg |
| 4,350,358 | A | * | 9/1982 | Ferris ................... B62D 61/125 180/24.01 |

(Continued)

*Primary Examiner* — Laura Freedman
(74) *Attorney, Agent, or Firm* — Kutak Rock LLP; James H. Jeffries (57) ABSTRACT

Provided is a tandem lift auxiliary axle suspension assembly for vehicles which can be selectively raised and lowered to adjust the overall vehicle weight to axle ratio. A tandem wheel mount is connected with a pair of torsion rods to a hanger depending from the vehicle frame. An air spring mounted between the beam and the frame dampen axle movement during use. A lift spring is mounted between the hanger and the torsion rods, or other components of the assembly to selectively raise and lower the tandem axles for ground engagement as needed to decrease the weight to axle ratio.

16 Claims, 8 Drawing Sheets

(56) References Cited

U.S. PATENT DOCUMENTS

| | | | | |
|---|---|---|---|---|
| 4,492,389 A * | 1/1985 | Wyatt | ................... | B62D 61/125 |
| | | | | 280/43.23 |
| 4,530,515 A * | 7/1985 | Raidel | ................... | B62D 61/125 |
| | | | | 280/683 |
| 4,756,550 A | 7/1988 | Raidel | | |
| 4,944,526 A | 7/1990 | Eberling | | |
| 5,403,031 A * | 4/1995 | Gottschalk | ............... | B60G 9/02 |
| | | | | 280/86.5 |
| 5,447,324 A | 9/1995 | Raidel, Sr. | | |
| 5,458,355 A * | 10/1995 | Young | .................... | B62D 61/12 |
| | | | | 180/24.02 |
| 5,505,482 A * | 4/1996 | VanDenberg | ............ | B60G 5/04 |
| | | | | 280/124.157 |
| 5,816,605 A | 10/1998 | Raidel | | |
| 5,868,078 A * | 2/1999 | Madison | ................. | B60F 1/043 |
| | | | | 105/72.2 |
| 6,007,078 A * | 12/1999 | Gottschalk | ............... | B60G 7/02 |
| | | | | 280/86.751 |
| 6,062,578 A * | 5/2000 | Richardson | ............ | B60G 11/28 |
| | | | | 280/81.6 |
| 6,796,566 B2 * | 9/2004 | VanDenberg | ............ | B60G 7/02 |
| | | | | 280/124.128 |
| 8,955,858 B2 | 2/2015 | Koontz et al. | | |
| 9,352,628 B2 | 5/2016 | Barton et al. | | |
| 9,731,780 B2 * | 8/2017 | Strong | ................. | B62D 53/062 |
| 9,738,338 B2 * | 8/2017 | Strong | .................... | B62D 61/12 |
| 10,543,730 B2 * | 1/2020 | Davis | ..................... | B60G 13/14 |
| 2014/0167378 A1 * | 6/2014 | Koontz | ............. | B60G 17/0526 |
| | | | | 280/124.11 |

* cited by examiner

TANDEM LIFT AUXILIARY AXLE ASSEMBLY

CROSS-REFERENCE TO RELATED APPLICATIONS

This application claims the benefit of U.S. Patent Application Ser. No. 62/551,743 filed Aug. 29, 2017, the disclosure of which is incorporated herein by reference.

BACKGROUND

Field of the Invention

This disclosure is in the field of suspension assemblies for truck or trailer suspension systems. More specifically, this disclosure is in the field of suspension assemblies for lift axles that may be selectively raised and lowered as desired by the vehicle operator.

The present invention relates to a tandem lift auxiliary axle assembly for use on heavy duty vehicles. Straight trucks and trailers used for heavy hauling applications, such as dump trucks, cement trucks and some trailers can be loaded with weight that exceeds the per axle limits imposed by some government regulations. Tag or auxiliary axles are often used to selectively increase the number of ground contacting axles when load weight necessitates increasing the number of axles in use to meet such regulations. One such example is a federal bridge act which limits vehicle weight when traversing certain bridges to a point that diminishes the effective carrying capacity of the vehicle. To optimize vehicle loading some vehicles are provided with one or more axles that can easily and quickly be lifted or lowered depending on the situation. Using the federal bridge act scenario, at least one tag axle can be lowered to engage the ground when traversing a bridge to decrease the overall weight per axle ratio of the vehicle.

Description of the Related Art

It is well known to provide one or more tag or auxiliary axles to a vehicle so the overall weight to axle ratio can be changed as needed. To date, the available axles are unitary lift axles. Each axle provided is independently lifted and lowered. To decrease axle construction cost, to decrease the installation space and overall weight, it is desirable to provide an auxiliary tandem axle assembly which doubles the number of ground engaging tires over single auxiliary axles while accomplishing the stated goals.

SUMMARY OF THE INVENTION

The current invention comprises an innovative tandem axle lift suspension assembly for use with over-the-road truck and trailer suspensions. A vehicle having a chassis is provided with longitudinal frame members. In traditional configuration, axles are oriented in a direction that is transverse to the frame members. It is understood that this description is for an assembly that will be utilized on each side of the axle as it attaches to a frame member of the chassis, such assemblies typically being provided in pairs for connection to both sides of the frame and the axle.

In various embodiments, one or more suspension members is pivotally attached to the frame of the vehicle and to a tandem wheel mount supporting the axles, and a lift mechanism is attached between the vehicle and a suspension member or another component of the suspension assembly to raise and lower the axles supported by the suspension assembly.

In the depicted embodiment, a suspension hanger depends from the frame and is connected thereto by conventional means such as bolting or welding. In some embodiments, the hanger comprises a pocket into which suspension components are fitted. Holes are provided for mounting mechanisms to retain suspension components within the hanger. In some embodiments, the suspension hanger may comprise multiple components attached together or separately attached to the frame of the vehicle. The exact shape of the suspension hanger described in relation to the figures is not limiting of the claimed invention.

In the depicted embodiments, the suspension member comprises an upper torsion bar and a lower torsion bar, each having a first end and an opposing second end. The first end of the upper torsion bar is fitted into or otherwise supported by the suspension hanger and pivotally attached to the suspension hanger. The first end of the lower torsion bar is fitted into or otherwise supported by the suspension hanger below the first end of the upper torsion bar and is also pivotally connected to the hanger. In some embodiments, resilient bushings are used to dampen the movement of the torsion bars within the suspension hanger, though other embodiments may utilize other means known for use in supporting pivotal connections in suspension assemblies. In some embodiments, mounting bolts or other similar means of pivotal attachment between the suspension hangar and the upper and lower torsion bars are provided transversally through the hanger and the respective first ends of each torsion bar.

A tandem wheel mount, preferably a walking beam configuration, is provided rearward, with respect to the direction of forward motion of the vehicle, of the suspension hangers. The tandem wheel mount comprises a forward wheel mount and a rearward wheel mount for rotatable attachment of ground-engaging wheels connected by a tandem wheel beam. An air spring mounting plate or flange is disposed on the upper surface of the tandem wheel beam between the forward wheel mount and the rearward wheel mount. In a preferred embodiment, a resilient air spring is mounted between the air spring mounting flange and the frame of the vehicle. In some embodiments, a generally upward projecting platform is provided on the tandem wheel beam between the forward and rearward wheel mounts. The platform projects generally upward toward the frame of the vehicle and may provide support to the air spring mounting flange.

The second end of the upper torsion bar and the second end of the lower torsion bar are both connected to the tandem beam by conventional, pivotal mounting means. Such mounting means may include pegs provided on the tandem wheel mount onto which bushings are mounted and fit into sockets on the second end of each torsion bar. Other means may also be used such as bolt through hole, capture within a pocket or bracket attachment similar in configuration to the suspension hanger. It is preferred the torsion bars are attached to the tandem wheel mount substantially between the forward and rearward wheel mounts and below the air spring mounting plate.

An air lift chamber is mounted in relation to the hanger bracket and fastened to one or both of the torsion bars. Pressurization or depressurization of the lift chamber selectively causes the tandem axle to be lifted away from ground-engagement or lowered to ground-engagement for use as determined by an operator. In alternative configurations, the air lift chamber may be mounted between the vehicle frame and torsion bars, the suspension hanger and torsion bar, the suspension hanger bracket and one of the torsion bars, between the torsion bars, or in some instances, between the frame and tandem wheel mount.

DETAILED DESCRIPTION

Figure 1:
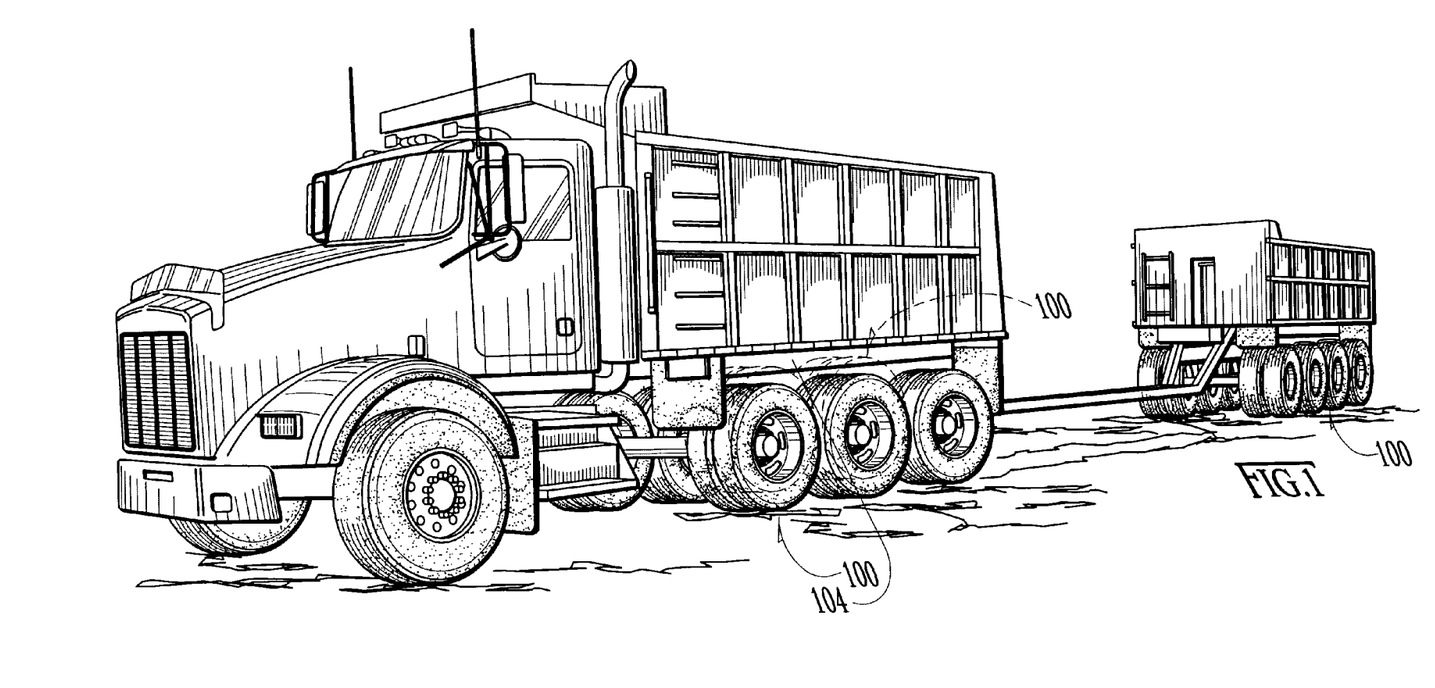
FIG. 1 is a perspective view of a vehicle and trailer utilizing an embodiment of the tandem lift auxiliary axle system.

Referring to FIG. 1, a vehicle is depicted with a trailer. The vehicle and trailer are provided with tandem lift axle suspension assemblies 100 for selectively increasing or decreasing the number of ground-engaging wheels at various times during vehicle operation. The suspension assemblies 100 are attached to the chassis 104 of the vehicle or trailer.

Figure 2:
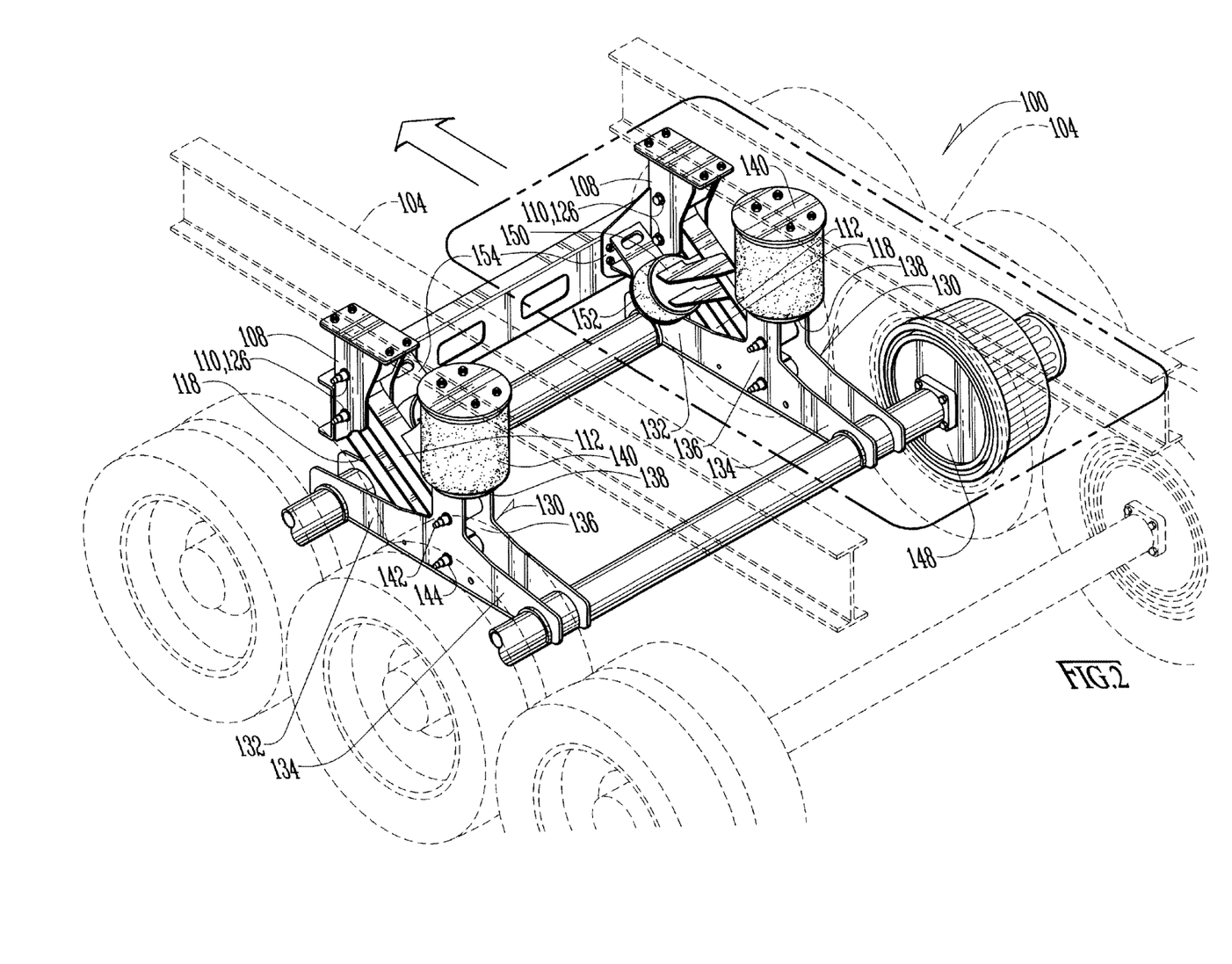
FIG. 2 is a perspective view of an embodiment of the tandem lift auxiliary axle system installed on a vehicle.
Figure 3:
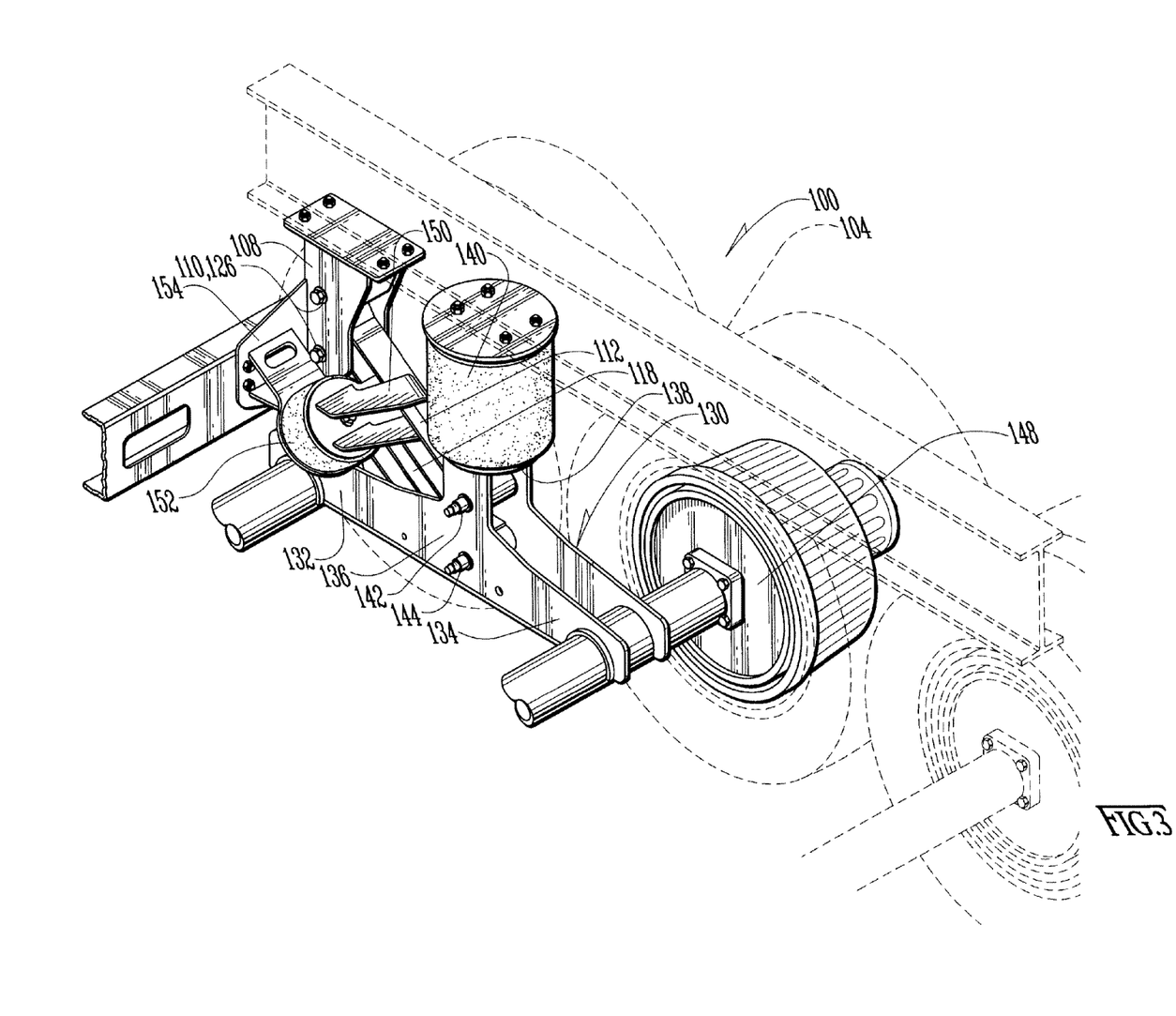
FIG. 3 is a perspective view of an embodiment of the tandem lift auxiliary axle system.
Figure 6:
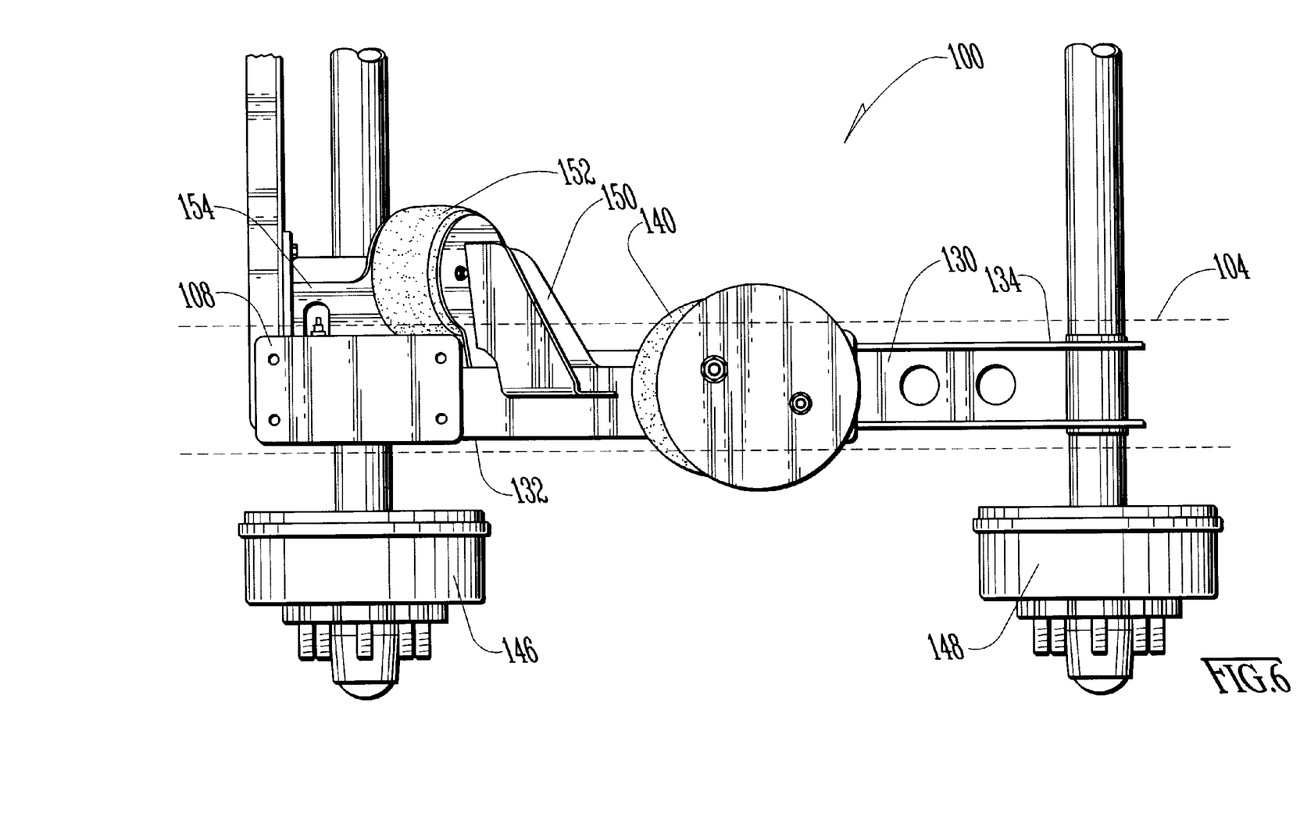
FIG. 6 is a top view of an embodiment of the tandem lift auxiliary axle system.

Referring now to FIGS. 2 and 3, an embodiment of the tandem axle vehicle suspension assembly 100 is depicted in a perspective view. In FIG. 2, the directional arrow represents the direction of forward motion during normal operation of a vehicle using the tandem lift auxiliary axle assembly. FIG. 6 depicts a top view of an embodiment of the suspension assembly 100 installed on a vehicle.

It is understood that a suspension system includes two identical assemblies, one positioned on either side of the vehicle at either end of the axles supporting the wheels as depicted in FIG. 2. Each of the suspension assemblies 100 is attached to the vehicle frame, and is provided with one or more suspension members that support the axles in relation to the vehicle. In the depicted embodiment, the suspension assemblies 100 are provided with a suspension hanger bracket 108 depending from the vehicle frame 104. In the depicted embodiment of the system, the frame 104 comprises spaced-apart rails, but in other vehicles the frame 104 may be comprised of different components or configurations of members without limiting the applicability or scope of this invention.

In the depicted embodiment, each suspension hanger bracket 108 has opposed sides and mounting bores 110 for the receipt and pivotal retention of an upper torsion rod 112 and lower torsion rod 118. In this embodiment, the suspension member at least one torsion rod, and in the depicted embodiment, comprises an upper and a lower torsion rod. The upper torsion rod 112 has a first end 114 and second end 116. Likewise, the lower torsion rod 118 has a first end 120 and second end 122. The first ends 114 and 120 are pivotally mounted within or to the hanger 108. In various embodiments, the pivotal connection may be by connectors 126 through bores 110 provided adjacent to the first ends 114 and 120. It is preferred that resilient bushings 124 or other bearings, are used on the connectors 126 to dampen movement during articulation of the torsion rods within the hanger bracket 108.

A tandem wheel mount 130, preferably a walking beam configuration, is provided rearward of the hanger bracket 108 and in substantial alignment with the direction of vehicle motion. The tandem wheel beam 130 has a forward end 132 and a rearward end 134. At the forward end 132, a forward wheel mount 146 is provided and at the rearward end 134, a rearward wheel mount 148 is provided. Non-drive, ground-engaging wheels are operably and rotatably connected at the wheel mounts 146 and 148. In some embodiments, a generally upward projecting frame platform 136 is provided on the beam 130 between the forward and rearward ends 132, 134. This platform 136 projects generally upward toward the frame 104 of the vehicle, and may be provided with a resilient air spring mounting flange 138. In preferred embodiments, a resilient air spring 140 is interposed between the frame 104 and air spring mounting flange 138.

The second end 116 of the upper torsion bar 112 and the second end 122 of the lower torsion bar 118 are both pivotally connected to the tandem wheel beam 130. In various embodiments, the pivotal connection is made by conventional mounting means such as pivot pins 142 and 144 respectively. In varying embodiments, such mounting means may include a peg provided on the tandem wheel beam 130 onto which bushings are mounted and fit into openings on the second end of each torsion bar. Other means may also be used such as bolt through hole, capture within a pocket or bracket attachment similar in configuration to the suspension hanger bracket 108. In a preferred embodiment, the second ends 116 and 122 mount substantially between the beam ends 132 and 134 and below the air spring mounting flange 138.

In some embodiments, such as that depicted in the figures, the tandem wheel beam may comprise two or more vertically oriented plates or members attached by horizontal plates or ribs. In such embodiments, the second ends 116 and 112 of the torsion arms 112 and 118 may be disposed between two adjacent vertically oriented plates and pivotally attached to both such plates.

A lift mechanism is provided to raise the tandem wheel mount 130 so that the wheels and tires mounted thereon are not in contact with the ground. In various embodiments of the suspension assembly, a pressurized air lift chamber 152 is mounted between a first component selected from the parts of the vehicle or the suspension assembly, and a second component selected from the parts of the vehicle or of the suspension assembly 100. In the depicted embodiment the lift mechanism comprises a first lift spring mounting bracket 150 fastened to the upper torsion rod 112, a second lift spring mounting bracket 154 fastened to the suspension hanger 108, and a lift air spring 152 disposed between the first and second lift spring mounting brackets 150 and 154. In the depicted embodiment, the brackets 150 and 154 position the lift air spring 152 to the side of the plane of movement of the torsion bars 112 and 118, thus allowing the torsion bars to be closer together than would be possible if the lift air spring 152 was disposed between the torsion bars 112 and 118.

In other embodiments of the suspension assembly, the first lift spring mounting plate may be attached to the vehicle frame 104, the lower torsion bar 118 or the tandem wheel mount 130. In other embodiments of the suspension assembly 100, the second lift spring mounting bracket may be attached to the vehicle frame 104, or the lower torsion arm 118, or the tandem wheel mount 130. Actuation of the lift chamber 152 selectively causes the tandem axle to be lifted or lowered for use as determined by an operator. In alternating configurations, the air lift chamber 152 can be mounted to the vehicle frame 104 and torsion bars 112, 118, the mounting means 150 and torsion bars 112, 118 or, in some instances, between the frame 104 and beam 130. In other embodiments, the air lift chamber may be mounted between the torsion bars 112 and 118, or between the suspension hanger bracket 108 and either of the torsion bars 112 or 118. In varying embodiments, the lift mechanism may be attached between any two components of the suspension assembly 100 or the vehicle frame 104 so long as expansion of the lift spring 152 between the lift spring mounting brackets 150 and 154 cause the torsion rods 112 and 118 to pivot upwardly.

Figure 4:
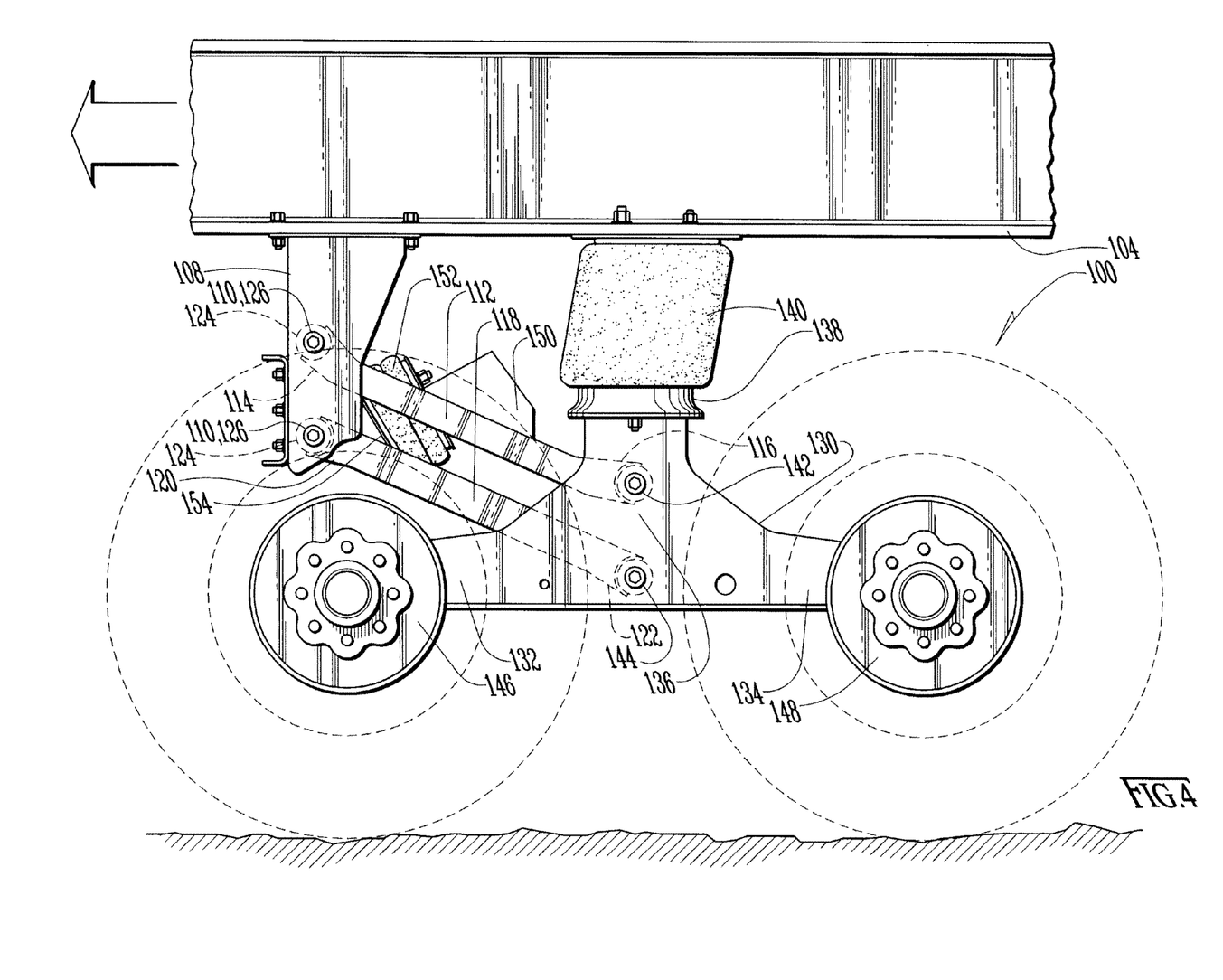
FIG. 4 is a side view of an embodiment of the tandem lift auxiliary axle system depicting the system in a ground-engaging, lowered position.
Figure 7:
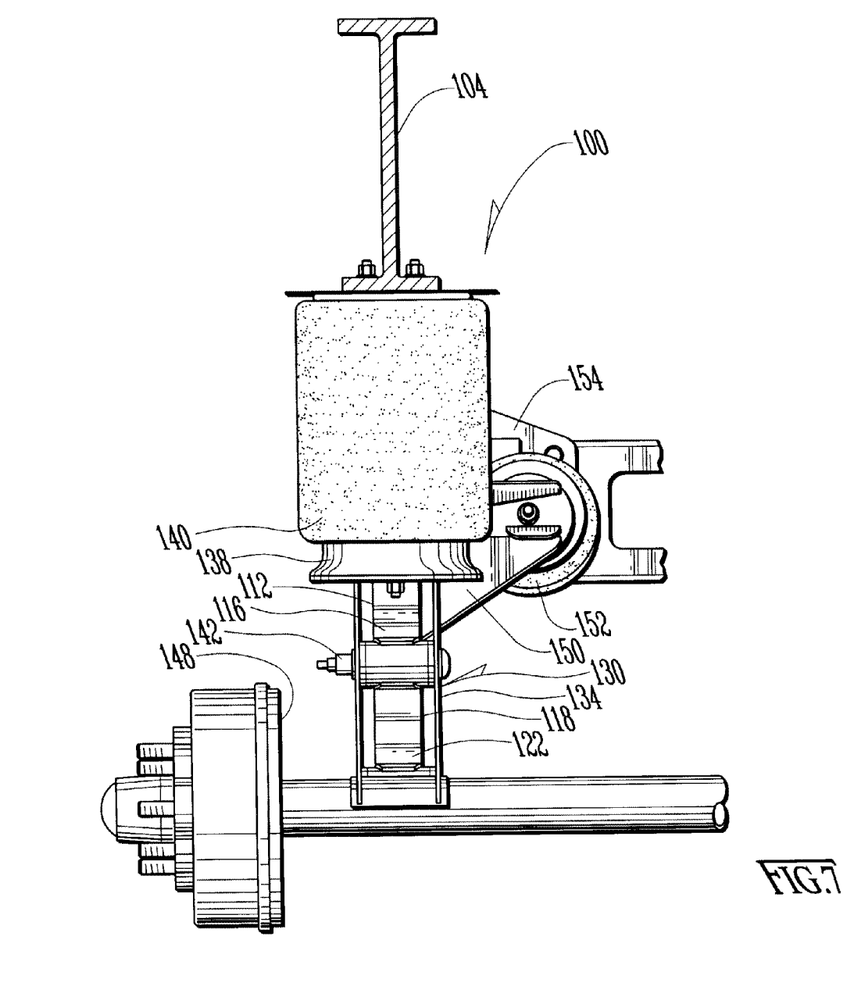
FIG. 7 is a rear view of an embodiment of the tandem lift auxiliary axle system in a lowered position.

Referring now to FIGS. 4 and 7, side and end views, respectively, of an embodiment of the suspension assembly 100 are depicted in a lowered, ground-engaging position. In this configuration, the air spring 140 is pressurized to push downwardly on the air spring mounting flange 138, urging the wheels and tires into a ground-engaging position. Simultaneously, the lift air spring 152 is depressurized to allow it to compress laterally so that the first and second lift spring mounting brackets 150 and 152 to move closer together. This allows the torsion rods 112 and 118 to pivot around their first ends so that the second ends 116 and 122 are farther away from the vehicle frame 104. In this configuration, air spring 140 provides suspension support to the tandem wheel mount 130 to support the weight of the vehicle.

Figure 5:
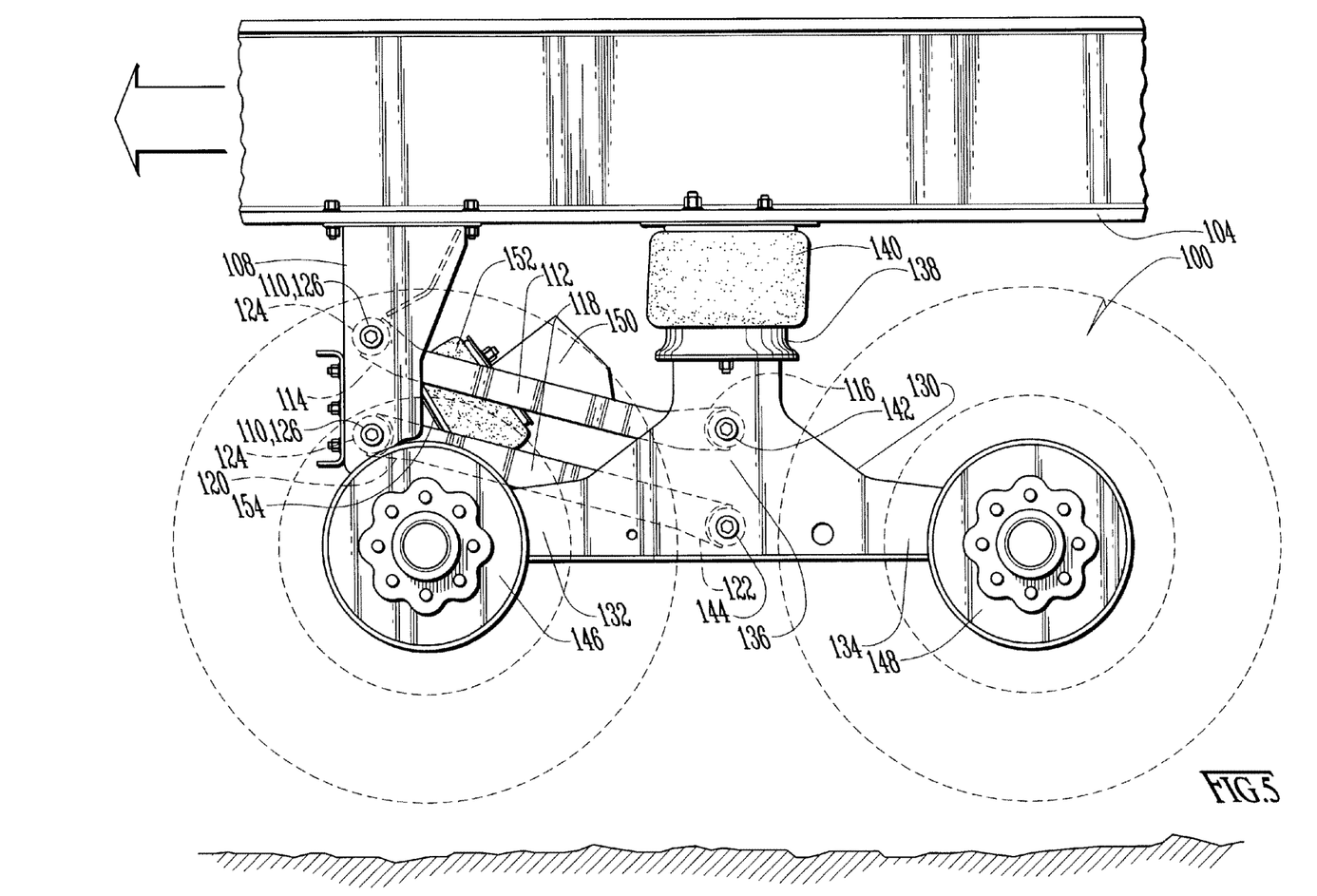
FIG. 5 is a side view of an embodiment of the tandem lift auxiliary axle system depicting the system in a raised position.
Figure 8:
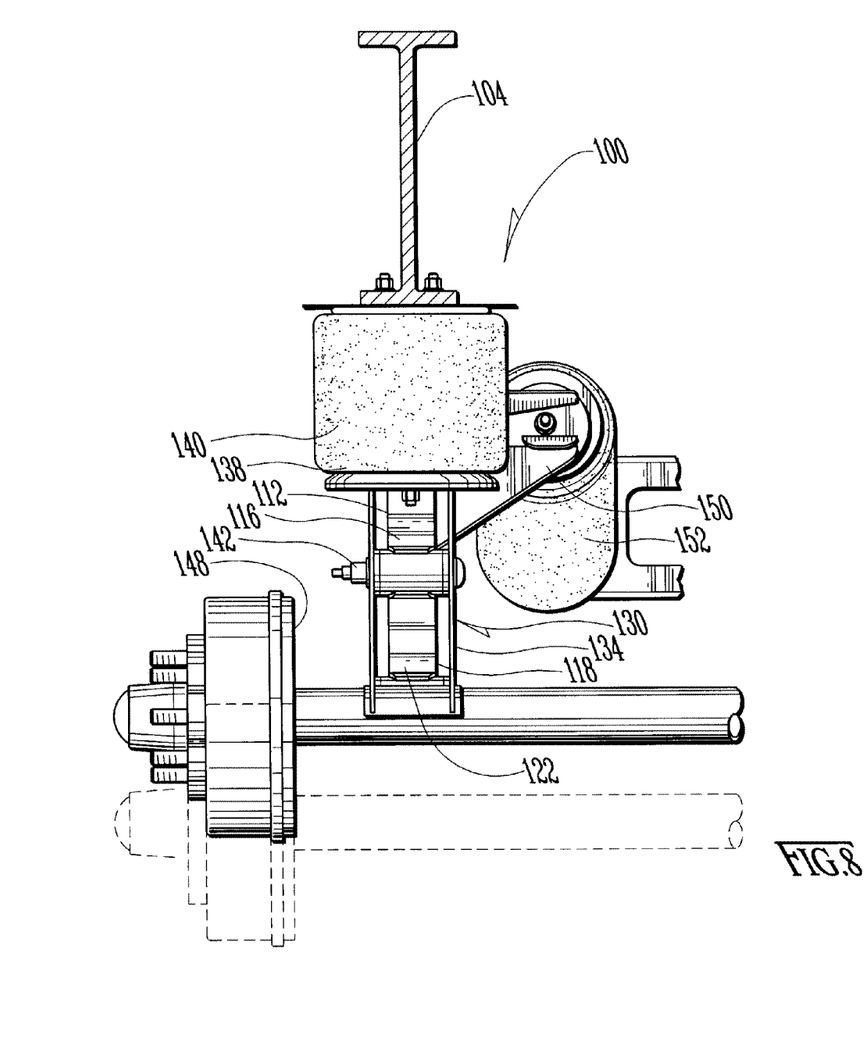
FIG. 8 is a rear view of an embodiment of the tandem lift auxiliary axle system in a raised position.

Referring now to FIGS. 5 and 8, side and end views, respectively, of an embodiment of the suspension assembly 100 are depicted in a raised, non-ground-engaging position. In this configuration, the air spring 140 is depressurized so that it may compress and allow the tandem wheel mount 130 closer to the vehicle frame 104 and raising the wheels and tires attached to the wheel mount 130 away from the ground. Simultaneously, the lift air spring 152 is pressurized to force the first lift spring mounting bracket 150 away from the second lift spring mounting bracket 154. The lift air spring 152 is actuated by the pneumatic pressurization and depressurization of internal chamber within the air spring 152.

As the lift air spring 152 pushes the first and second lift spring mounting brackets 150 and 154 apart, the brackets push in turn on the components of the suspension assembly to which they are attached. In the depicted embodiment, the first bracket 150 is attached to the upper torsion rod 112, and the second bracket 154 is attached to the suspension hanger bracket 108. As the rod 112 is pushed away from the hanger bracket 108, it causes the rod 112 to pivot around its first end 114 causing the second end 116 to move closer to the vehicle frame 104. This pivoting of upper torsion arm 112 causes the tandem wheel mount 130 and lower torsion rod 118 to also pivot upwards, thus raising the wheels and tires away from the ground. This position is maintained by continued pressurization of the lift air spring 152 and the depressurization of the air spring 140.

Changes may be made in the above methods, devices and structures without departing from the scope hereof. Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A tandem lift auxiliary axle suspension assembly for a vehicle having a vehicle frame and a tandem wheel mount attached to at least two ground engaging wheels, and at least one air spring disposed between the tandem wheel mount and the vehicle frame, the tandem lift auxiliary axle assembly comprising:
   a suspension hanger bracket depending from the vehicle frame;
   an upper torsion rod and a lower torsion rod, each torsion rod pivotally connected at a first end thereof to the hanger bracket;
   the tandem wheel mount disposed rearward of the suspension hanger bracket,
   the upper and lower torsion rods each pivotally connected at a second end thereof to the tandem wheel mount;
   a lift mechanism comprising a lift spring, and a first and second lift spring mounting bracket; and
   wherein the first lift spring mounting bracket is attached to a first component of the suspension assembly, and the second lift spring mounting bracket is attached to a second component of the suspension assembly; and
   wherein the lift spring may be actuated to raise or lower the tandem wheel mount and the ground engaging wheels.

2. The suspension assembly of claim 1 wherein the first component is selected from the group consisting of the upper torsion rod, the lower torsion rod, the tandem wheel mount, the suspension hanger bracket, and the vehicle frame.

3. The suspension assembly of claim 2 wherein the second component is selected from the group consisting of the upper torsion rod, the lower torsion rod, the tandem wheel mount, the suspension hanger bracket, and the vehicle frame; and wherein the second component is not the same as the first component.

4. The suspension assembly of claim 1 wherein the first component is the upper torsion rod.

5. The suspension assembly of claim 4 wherein the second component is the vehicle frame.

6. The suspension assembly of claim 5 wherein the second end of the upper and lower torsion rods are attached to the tandem wheel mount beneath the air spring.

7. The suspension assembly of claim 6 wherein the first and second lift spring mounting brackets position the lift spring to the side of the upper and lower torsion rods.

8. The suspension assembly of claim 7 wherein the tandem wheel mount comprises at least two vertical members, and the second ends of the upper and lower torsion rods are pivotally attached between the at least two vertical members.

9. The suspension assembly of claim 8 wherein the tandem wheel mount is attached to a first axle and a second axle for supporting the ground-engaging wheels.

10. The suspension assembly of claim 1 wherein when pneumatic pressure in the air spring is decreased and pneumatic pressure in the lift spring is increased, the tandem wheel mount moves to a raised position.

11. The suspension assembly of claim 1 wherein when pneumatic pressure in the air spring is increased and pneumatic pressure in the lift spring is decreased, the tandem wheel mount moves to a lowered position.

12. A suspension assembly for a vehicle, the vehicle having a frame and a tandem wheel mount for supporting at least two axles, and an air spring disposed between the tandem wheel mount and the frame for supporting a portion of the weight of the vehicle, the suspension assembly comprising:
   a suspension member pivotally connected at a first end thereof to the frame of the vehicle, and pivotally connected at a second end thereof to the tandem wheel mount;
   a lift mechanism mounted between the suspension member and the frame of the vehicle; and
   wherein when the lift mechanism is actuated, the tandem wheel mount is raised or lowered; and
   wherein the suspension member comprises an upper torsion rod and a lower torsion rod.

13. The suspension assembly of claim 12, wherein each of the upper and lower torsion rods are pivotally fastened at a first end thereof to the frame, and at a second end thereof to the tandem wheel mount.

14. The suspension assembly of claim 13, wherein the upper and lower torsion rods are pivotally fastened to the tandem wheel mount at a point thereon that is substantially between the forward and rearward ends thereof, and below the air spring.

15. The suspension assembly of claim 13 wherein the lift mechanism is attached to the upper torsion rod of the suspension member.

16. The suspension assembly of claim 15 further comprising a suspension hanger bracket attached to the frame of the vehicle, wherein the first end of the upper and lower torsion rods are pivotally attached to the suspension hanger bracket.

* * * * *